United States Patent
Montazeaud et al.

(10) Patent No.: US 11,518,713 B2
(45) Date of Patent: Dec. 6, 2022

(54) USE OF A CLAY IN THE PREPARATION OF A GEOPOLYMER PRECURSOR

(71) Applicant: VICAT, Paris la Defense (FR)

(72) Inventors: Benoit Montazeaud, Vienne (FR); Laury Barnes-Davin, Voiron (FR)

(73) Assignee: VICAT, Paris la Defense (FR)

( * ) Notice: Subject to any disclaimer, the term of this patent is extended or adjusted under 35 U.S.C. 154(b) by 106 days.

(21) Appl. No.: 17/260,129

(22) PCT Filed: Aug. 2, 2019

(86) PCT No.: PCT/EP2019/070861
§ 371 (c)(1),
(2) Date: Jan. 13, 2021

(87) PCT Pub. No.: WO2020/025784
PCT Pub. Date: Feb. 6, 2020

(65) Prior Publication Data
US 2021/0284573 A1    Sep. 16, 2021

(30) Foreign Application Priority Data

Aug. 3, 2018 (FR) ..................... 1857274

(51) Int. Cl.
*C04B 14/10* (2006.01)
*C04B 14/20* (2006.01)
*C04B 28/00* (2006.01)
*C04B 28/04* (2006.01)

(52) U.S. Cl.
CPC ............ *C04B 14/106* (2013.01); *C04B 14/20* (2013.01); *C04B 28/006* (2013.01); *C04B 28/04* (2013.01)

(58) Field of Classification Search
CPC ......... C04B 7/12; C04B 14/10; C04B 14/106; C04B 14/12; C04B 14/20; C04B 14/28; C04B 20/04; C04B 20/06; C04B 28/04; C04B 28/006; C04B 28/26; C04B 40/0042; C04B 2103/0088; Y02P 40/10
See application file for complete search history.

(56) References Cited

FOREIGN PATENT DOCUMENTS

| EP | 2 253 600 A1 | 11/2010 |
| EP | 2 727 894 A1 | 5/2014 |
| EP | 3 078 425 A1 | 10/2016 |

OTHER PUBLICATIONS

Sperberga et al "Comparative study of illite clay and illite-based geopolymer products", ICC3: Symposium 16: Innovation in Refractories and Traditional Ceramics, IOP Conf. Series: Materials Science and Engineering 18 (2011) 222027 doi:10.1088/1757-899X/18/22/222027 (Year: 2011).*
Hu "Geopolymerization of illite/smectite (Friedland Clay)—An investigation of reaction processes, microstructure and strength development" Inaugural Dissertation. (Year: 2016).*
Buchwald, A et al., "The Suitability of Thermally Activated Illite/Smectite Clay as Raw Material for Geopolymer Binders", Applied Clay Service, vol. 46, No. 3, (2009), pp. 300-304.
Seiffarth, T. et al., "Effect of Thermal Pre-Treatment Conditions of Common Clays on the Performance of Clay-Based Geopolymeric Binders", Applied Clay Science, vol. 73, (2013), pp. 35-41.
Dupuy, C. et al., "Alkali-Activated Materials Based on Callovo-Oxfordian Argillite: Formation, Structure and Mechanical Properties", Journal Ceramic Science and Technology, vol. 9, No. 2, (2018), pp. 127-140.
Monsif, M. et al., "The Implementation of Geopolymers Materials From Moroccan Clay, Within the Framework of the Valorization of the Local Natural Resources", Journal of Materials and Environmental Sciences ISSN: 2028-2508, vol. 8, (2017), pp. 2704-2721.
Guimaraes De Azeredo Melo, Lis et al., "Physicochemical Characterization of Pulverized Phyllite Rock for Geopolymer Resin Synthesis", Materials Research, vol. 20, Suppl. 2, (2017), pp. 236-243.
Louati, S. et al., "Geopolymers Based on Phosphoric Acid and Illito-Kaolinitic Clay", Hindawi Publishing Corporation Advances in Materials Science and Engineering, vol. 2016, Article ID 2359759, (2016), pp. 1-7.
Oct. 4, 2019 Search Report issued in International Patent Application No. PCT/EP2019/070861.
Feb. 9, 2021 International Preliminary Reporton Patentability issued in International Patent Application No. PCT/EP2019/070861.

* cited by examiner

*Primary Examiner* — Anthony J Green
(74) *Attorney, Agent, or Firm* — Oliff PLC

(57) ABSTRACT

A method for the use of a clay including: less than 30% of kaolinite; and at least 20% of muscovite and/or illite; from 1% to 20% of smectite; the muscovite and/or illite/kaolinite weight ratio being greater than 1; for the preparation of a geopolymer precursor.

12 Claims, No Drawings

USE OF A CLAY IN THE PREPARATION OF A GEOPOLYMER PRECURSOR

The present invention relates to the use of a clay in the preparation of a geopolymer precursor.

The production of hydraulic binders, and in particular of cements, essentially consists of a calcination of a mixture of properly selected and dosed raw materials, also referred to by the term «raw mix». Baking of this raw mix results in an intermediate product, clinker, which, when milled with possible mineral additions, will result in cement. The produced cement type depends on the nature and proportions of the raw materials as well as on the baking method.

Different types of cements can be distinguished: Portland cements (which represent the vast majority of cements produced throughout the world), aluminous cements (or calcium aluminate), prompt natural cements, sulfo-aluminous cements, sulfo-belitic cements and other intermediate varieties.

The most widespread cements are Portland-type cements. Portland cements are obtained from Portland clinker, obtained after clinkering at a temperature in the range of 1450° C. of a calcium carbonate rich raw mix in a furnace. The production of one ton of Portland cement is accompanied by the emission of very large amounts of CO2 (about 0.8 to 0.9 tons of CO2 per ton of cement in the case of a CEM I).

Yet, in 2014, the amount of cement that has been sold in the world was around 4.2 billion tons (source: French cement industry trade union—SFIC). This ever increasing number has more than doubled in 15 years. The development of alternate cements with a lower carbon footprint is the focus of many researches.

In this context, and over the last years, a family of non-hydraulic binders rather activated by a chemical solution, geopolymers, has proved to be a possible solution to the reduction of the carbon impact of building materials.

Geopolymers are obtained through the association of two constituents:
 a solid in the form of a powder called «precursor; and
 an activation solution commonly called «activator».

These building materials have a long-term strength comparable with that of the building materials prepared from conventional Portland cements, and can be prepared while significantly limiting the $CO_2$ emissions.

Kaolinite is a clay with a formula $ASH_2$ where A represents alumina $Al_2O_3$, S represents silica $SiO_2$ and H represents water $H_2O$. Its crystallographic structure is organized in silica and alumina leaflets linked together by water molecules.

When kaolinite is brought to a temperature from 500° C. to 700° C., its water molecules are eliminated in the form of water steam, which results in several consequences in terms of structure and reactivity, amongst which:
 a disappearance of the leaflets layout resulting in the introduction of a structural disorder (this is called amorphization); and
 a very high increase in Blaine specific surface which may reach several ten times that of a conventional cement.

The calcination of kaolinic clays allows obtaining a material, conventionally referred to as «metakaolin». Metakaolin is well known to those skilled in the art and constitutes, in particular, an addition for concrete, recognized in standards like a silica fume. In particular, metakaolin is used as a geopolymer precursor.

Nevertheless, the calcination of the kaolinite allowing obtaining metakaolin is energy-intensive and therefore expensive. Furthermore, metakaolin can be found only in limited amounts and its price is therefore high.

To overcome this difficulty, the use of a natural clay low in kaolinite and available in larger amounts for the preparation of geopolymer precursors by calcination has been tested. However, the materials finally obtained have unsatisfactory mechanical performances, and this solution is less privileged on the date of the present invention.

Yet, quite surprisingly, it has now been found that clays having kaolinite contents substantially lower than 35% but rich in muscovite and/or illite and further containing smectitie may, once calcined, be used as a geopolymer precursor, and that the geopolymers prepared from this precursor, alone or combined with another conventionally used precursor, have a long-term strength comparable with that of the building materials prepared from the conventional Portland cements or geopolymers obtained from clays rich in kaolintes.

Thus, the present invention relates to the use of a clay comprising:
 less than 30% of kaolinite;
 at least 20% of muscovite and/or illite; and
 from 1% to 20% of smectite;
 the muscovite and/or illite/kaolinite weight ratio being greater than 1;
for the preparation of a geopolymer precursor.

The above-described clays rich in muscovite and/or illite and further containing smectite, but having kaolinite contents substantially lower than 35% may, once calcined, be used as geopolymers precursor. The geopolymers prepared from this precursor, alone or combined with another conventionally used precursor, have a long-term strength comparable with that of the building materials prepared from conventional Portland cements or geopolymers obtained from clays rich in kaolinites. Furthermore, the calcination of the clays according to the invention is less energy-intensive than that of the clays rich in kaolinites.

In the context of the present invention:
 by «clay», it should be understood any natural material rich in alumina and silica, essentially constituted by silicates and phyllosilicates;
 by «muscovite», it should be understood the mineral from the phyllosilicates family of formula $KAl_2(AlSi_3O_{10})(OH,F)_2$;
 by «illite», it should be understood the mineral from the phyllosilicates family of formula $(K,H_3O)(Al,Mg,Fe)_2(Si,Al)_4O_{10}[(OH)_2,(H_2O)]$;
 by «kaolinite», it should be understood the mineral from the phyllosilicates family of formula $Al_2Si_2O_5(OH)_4$;
 by «smectite», it should be understood the mineral from the phyllosilicates family of typical formula $A_{0,3}D_{2-3}T_4O_{10}Z_2 \cdot nH_2O$, where A represents an interfoliar cation (alkaline or alkaline earth element), D an octahedral cation, T a tetrahedral cation, O oxygen and Z a monovalent anion (in general $OH^-$). As an example of smectite, mention may be made in particular to montmorillonite;
 by «calcite», it should be understood a polymorph of calcium carbonate $CaCO_3$;
 by «dolomite», it should be understood magnesium carbonate $MgCO_3$;
 by «microcline», it should be understood the mineral from the tectosilicates family of formula $KAlSi_3O_8$;
 by «hematite», it should be understood iron oxide (III) $Fe_2O_3$;
 by «amorphous phase», it should be understood the non or poorly diffracting fraction of the material. In X-ray diffraction, only the diffracting species can be identified and quantified via the Rietveld method using the internal or external standards method;

by «geopolymer precursor», it should be understood any material likely to be solubilized by an activation solution constituted by a silicate (in particular a sodium or potassium silicate) and/or from an alkaline (in particular soda or potash), or from an acid (in particular phosphoric acid), into aluminates and silicates monomers that con lead to a geopolymer by polycondensation; and by «geopolymer», it should be understood any alkaline aluminosilicate material, alkali-activated material or inorganic polymer, obtained through the reaction of an aluminosilicate precursor and an activation solution constituted by a silicate (in particular a sodium or potassium silicate) and/or an alkaline (in particular soda or potash), or an acid (in particular phosphoric acid). The activation solution enables the dissolution of the aluminosilicate precursor into aluminates and silicates monomers which are polycondensed into an inorganic material.

In the context of the present invention, the median diameter or d50 corresponds to the diameter below which is the overall mass of 50% of the particles of the considered sample. This may be determined by any method known to those skilled in the art, in particular by dry or wet laser diffraction analysis.

Finally, in the context of the present invention, the proportions expressed in % correspond to mass percentages with respect to the overall weight of the considered entity.

Hence, an object of the present invention is the use of a clay having the above-described mineralogical characteristics for the preparation of a geopolymer precursor. Preferably, an object of the present invention is the use of a clay as previously defined for the preparation of a geopolymer precursor, said clay having the following features, considered separately or in combination:

the clay contains less than 25% of kaolinite, still preferably less than 20% of kaolinite, quite preferably less than 15% of kaolinite;

the clay contains at least 25% of muscovite and/or illite, still preferably from 25% to 50% of muscovite and/or illite, quite preferably from 25% to 40% of muscovite and/or illite;

the muscovite and/or illite/kaolinite weight ratio in the used clay is greater than 1, quite preferably greater than 2;

the clay contains from 2% to 17% of smectite, preferably from 3% to 15% of smectite, quite preferably from 5% to 10% of smectite;

the clay further contains at least 1% of calcite, preferably at least 2% of calcite, quite preferably from 3% to 5% of calcite;

the clay further contains an amorphous phase containing silica, alumina and/or calcium. Preferably, the clay contains from 1% to 20% of said amorphous phase. Still preferably, the clay contains from 3% to 10% of said amorphous phase; and/or the clay further contains chlorite, quartz, dolomite, microcline and/or hematite.

Hence, the above-described clay may be used to prepare a geopolymer precursor by calcination. Thus, another object of the present invention is a method for preparing a geopolymer precursor from the previously-described clay, said method comprising the following steps:

possible drying and then possible milling of the clay;

calcination of the obtained material at a temperature comprised between 650° C. and 900° C.; and possible deagglomeration of the obtained calcined clay, for example by milling, until reaching a median diameter from 10 μm to 20 μm.

During the possible milling of the clay before calcination, the latter is preferably performed in order to obtain a powder 100% passing through a 2 mm sieve.

The calcination step may be conducted using a rotary calciner, within which it lasts about 30 to 90 minutes. However, a «flash calciner» may also be used to calcine the clay in order to obtain a geopolymer precursor, in which case the calcination step is very brief (1 to 2 seconds, and even shorter). The fact that a flash calciner could be used allows considerably reducing the energy required for the calcination and for the preparation of the geopolymer precursor.

During the possible milling of the calcined clay, the latter is performed until reaching a median diameter smaller than or equal to 25 μm, still preferably smaller than or equal to 20 μm, quite preferably smaller than or equal to 15 μm.

The present invention may be illustrated, without limitation, by the following examples.

EXAMPLE 1

Calcination of the Clay 1.1—Composition of the Clay

A raw clay having the mineralogical composition reported in the following Table 1 is used.

TABLE 1

Mineralogical composition of the clay before calcination

| Category | Phase | % (w/w) |
|---|---|---|
| Clays | Muscovite/Illite | 39.8 |
| | Kaolinite | 14.9 |
| | Chlorite | 5.6 |
| | Smectite | 7.9 |
| Carbonates | Calcite | 4.1 |
| | Dolomite | 5.4 |
| Others | Quartz | 12.2 |
| | Hematite | 1 |
| | Albite | 0.4 |
| | Anatase | 2.1 |
| | Microcline | 2.3 |
| Amorphous phase | | 4.3 |

The clay hereinabove has the chemical composition (in % (w/w)) reported in the following Table 2.

TABLE 2

☐ Chemical composition of the clay before calcination

| $SiO_2$ | $Al_2O_3$ | $Fe_2O_3$ | CaO | MgO | $SO_3$ | $K_2O$ | $Na_2O$ | SrO | $TiO_2$ | $P_2O_5$ | MnO | Loss on ignition |
|---|---|---|---|---|---|---|---|---|---|---|---|---|
| 47.79 | 20.94 | 6.16 | 4.24 | 2.90 | 0.08 | 2.75 | 0.26 | 0.02 | 0.99 | 0.08 | 0.04 | 13.83 |

The used clay further has the physical characteristics reported in the following Table 3.

TABLE 3

Physical characteristics of the clay before calcination

| | | |
|---|---|---|
| Density (in g/cm$^3$) | | 2.6 |
| Specific surface | Blaine (in cm$^2$/g) | 2300 |
| | BET (in m$^2$/g) | 43.9 |

1.2—Calcination of the Clay 1.2.1 In the Laboratory Furnace

The above-described clay is dried for 12 hours at 105° C. and then milled in a ring mill until reaching a median diameter from 30 to 40 μm. The powder prepared in this manner is baked in a laboratory furnace by batches of 200 g at 800° C. for 1 h 00 with hot loading and unloading. Afterwards, the calcined clay obtained in this manner (calcined clay AC-1) is milled again slightly in a planetary mill (15 seconds, 700 rpm) to deagglomerate it and obtain a median diameter of 20 μm.

1.2.2 In the Flash Calciner

The above-described clay is dried for 72 hours at 105° C. and then crushed in a jaw crusher until obtaining 100% passage through a 2 mm sieve. Afterwards, the powder obtained in this manner is calcined in a flash calciner at 625° C. (calcined clay ACF-1), 780° C. (calcined clay ACF-2), 870° C. (calcined clay ACF-3) or 875° C. in a reducing atmosphere (calcined clay ACF-4) with an average stay time from 1 to 2 seconds. Afterwards, the calcined clay obtained in this manner is milled again in a vertical mill to deagglomerate it and obtain a median diameter of 10-11 μm.

The calcined clays obtained in this manner are analyzed. The mineralogical composition (in % (w/w)) of the latter is reported in the following Table 4.

TABLE 4

Mineralogical composition of the calcined clays ACF-1 to ACF-4

| Category | Phase | ACF-1 | ACF-2 | ACF-3 | ACF-4 |
|---|---|---|---|---|---|
| Clays | Muscovite/Illite | 26.4 | 24.8 | 17.6 | 17.2 |
| | Kaolinite | 5.8 | 2.5 | — | — |
| | Chlorite | 3.1 | — | — | — |
| Carbonates | Calcite | 3.3 | 3 | 1.7 | 2.1 |
| | Dolomite | 1.1 | 0.2 | — | — |
| Others | Quartz | 10.7 | 11.8 | 12.1 | 11.9 |
| | Hematite | 1.7 | 1.8 | 1.9 | 1.6 |
| | Microcline | 4.2 | 3.5 | 2.3 | 2.3 |
| | Free lime | — | 0.5 | 0.5 | 0.4 |
| | Periclase | — | 0.5 | 0.4 | 0.4 |
| Amorphous phase | | 43.8 | 51.3 | 63.4 | 64 |

EXAMPLE 2

Mortar Composition

Preparation of the Mortars 1 to 10

In this example, the geopolymer precursor is the calcined clay ACF-3.

A reference mortar (hereinafter the Mortar 1) is prepared from a cement Portland CEM II 32.5 according to the standard EN 196-1. The composition of the mortar 1 is as follows:

450 g of cement CEM II 32.5;
1350 g of standard sand; and
225 g of water.

In turn, the mortars 2 to 10 have been prepared from 506 to 570 ml of a geopolymer binder and 1350 g of a standard sand, the composition of the geopolymer binder being as follows:

561 ml-54% of ACF-3/9% of SiO$_2$/8% Na$_2$O/29% water (mortar 2);

523 ml-51% of ACF-3/9% of SiO$_2$/7% Na$_2$O/33% water (mortar 3);

506 ml-49% of ACF-3/11% of SiO$_2$/10% Na$_2$O/31% water (mortar 4);

566 ml-53% of ACF-3/7% of SiO$_2$/9% Na$_2$O/31% water (mortar 5);

547 ml-56% of ACF-3/6% of SiO$_2$/8% Na$_2$O/30% water (mortar 6);

558 ml-57% of ACF-3/8% of SiO$_2$/5% Na$_2$O/30% water (mortar 7);

570 ml-52% of ACF-3/11% of SiO$_2$/8% Na$_2$O/28% water (mortar 8);

554 ml-55% of ACF-3/8% of SiO$_2$/8% Na$_2$O/29% water (mortar 9); and 557 ml-56% of ACF-3/10% of SiO$_2$/6% Na$_2$O/29% water (mortar 10).

Mechanical Strength

The mechanical strength of the mortars is measured in accordance with the standard EN 196-1 on 4×4×16 cm$^3$ prismatic test specimens of the mortars prepared at 20° C.

The results of the measurements of the compressive strength (Rc) at 7 days are reported in the following Table 5.

TABLE 5

Compressive strengths

| Mortar | Compressive Strength at 7 days (in MPa) |
|---|---|
| 1 (reference) | 30 |
| 2 | 20.6 |
| 3 | 18 |
| 4 | 10 |
| 5 | 12.3 |
| 6 | 19.3 |
| 7 | 20.4 |
| 8 | 18.6 |
| 9 | 18.1 |
| 10 | 28.7 |

It comes out that the mortars prepared from a geopolymer obtained from a sufficient amount of calcined clay (mortars 2, 3, 6, 7, 8, 9 and 10) have a mechanical strength at 28 days that is comparable with that of the mortar prepared from the Portland cement alone (mortar 1) and comparable with that of the mortar prepared from a Portland cement.

EXAMPLE 3

Mortar Composition

Preparation of the Mortars 11 to 16

In this example, the geopolymer precursor is a mixture of calcined clay ACF-3 and metakaolin (MK) in the following proportions:

55% of ACF-3; and
45% of metakaolin.

The mortars 11 to 16 have been prepared from 506 to 598 ml of a geopolymer binder and 1350 g of a standard sand, the composition of the geopolymer binder being as follows:

598 ml-51% of MK/7% of SiO$_2$/9% Na$_2$O/33% water (mortar 11—reference);
563 ml-54% of MK+ACF-3/9% of SiO$_2$/8% Na$_2$O/29% water (mortar 12);
506 ml-52% of MK+ACF-3/9% of SiO$_2$/7% Na$_2$O/31% water (mortar 13);
570 ml-52% of MK+ACF-3/12% of SiO$_2$/8% Na$_2$O/29% water (mortar 14);
553 ml-55% of MK+ACF-3/8% of SiO$_2$/8% Na$_2$O/29% water (mortar 15); and
566 ml-56% of MK+ACF-3/10% of SiO$_2$/6% Na$_2$O/29% water (mortar 16).

Mechanical Strength

The mechanical strength of the mortars is measured on 4×4×16 cm$^3$ prismatic test specimens of the mortars prepared at 20° C. according to the standard EN 196-1.

The results of the measurements of the compressive strength (Rc) are reported in the following Table 6.

TABLE 6

| Compressive strengths | |
|---|---|
| Mortar | Compressive Strength at 7 days (in MPa) |
| 11 (reference) | 41.2 |
| 12 | 48.4 |
| 13 | 43.3 |
| 14 | 50.0 |
| 15 | 43.5 |
| 16 | 39.8 |

It comes out that the mortars prepared from a geopolymer obtained from a mixture of metakaolin and calcined clay (mortars 12 to 16) have a mechanical strength at 7 days that is higher than that of a mortar prepared from a geopolymer obtained from the metakaolin alone (mortar 11).

EXAMPLE 4

Comparative Tests

A raw clay having the mineralogical composition reported in the following Table 7 is used.

TABLE 7

| Mineralogical composition of the clay before calcination | | |
|---|---|---|
| Category | Phase | % (w/w) |
| Clays | Muscovite/Illite | 60.2 |
|  | Kaolinite | 16.2 |
|  | Chlorite | 0 |
|  | Smectite | 0 |
| Carbonates | Calcite | 5.4 |
|  | Dolomite | 0.2 |
| Others | Quartz | 1.9 |
|  | Hematite | 0 |
|  | Albite | 0.8 |
|  | Anatase | 0.1 |
|  | Microcline | 15.2 |
| Amorphous phase |  | 0 |

Hence, this clay does not contain smectite.

This clay is calcined under the conditions described for the clay ACF-3 (cf. Example 1—item 1.2). The calcined clay ACF-5 is thus obtained.

The mortars 17 to 19 have been prepared from 506 to 598 ml of a geopolymer binder and 1350 g of a standard sand, the composition of the geopolymer binder being as follows:

563 ml-54% of ACF-5/9% of SiO$_2$/8% Na$_2$O/29% water (mortar 17);
506 ml-52% of ACF-5/9% of SiO$_2$/7% Na$_2$O/31% water (mortar 18); and
570 ml-52% of ACF-5/12% of SiO$_2$/8% Na$_2$O/29% water (mortar 19).

Mechanical Strength

The mechanical strength of the mortars is measured on 4×4×16 cm$^3$ prismatic test specimens of the mortars prepared at 20° C. according to the standard EN 196-1.

The results of the measurements of the compressive strength (Rc) are reported in the following Table 8.

TABLE 8

| Compressive strengths | |
|---|---|
| Mortar | Compressive Strength at 7 days (in MPa) |
| 17 | <3.0 |
| 18 | <3.0 |
| 19 | <3.0 |

It comes out that the mortars prepared rom a geopolymer obtained from the calcined clay ACF-5 (mortars 17 to 19) have very low mechanical strengths. These mechanical strengths are lower than the detection threshold of the press. These strengths are much lower than those obtained on a mortar composed by the clay ACF-3.

The invention claimed is:

1. A method for preparing a geopolymer precursor comprising the following steps:
   providing a clay comprising:
   less than 30% of kaolinite;
   at least 20% of at least one of muscovite and illite; and
   from 1% to 20% of smectite;
   a weight ratio of the at least one of muscovite and illite to the kaolinite being greater than 1;
   optionally drying the clay;
   optionally milling the clay;
   calcining the clay at a temperature between 650° C. and 900° C.; and
   optionally deagglomerating the calcined clay until reaching a median diameter from 10 μm to 20 μm.

2. The method according to claim 1, wherein the clay contains less than 25% of kaolinite.

3. The method according to claim 2, wherein the clay contains less than 20% of kaolinite.

4. The method according to claim 1, wherein the clay contains at least 25% of at least one of muscovite and illite.

5. The method according to claim 4, wherein the clay contains from 25% to 50% of at least one of muscovite and illite.

6. The method according to claim 1, wherein the weight ratio of the at least one of muscovite and illite to the kaolinite is greater than 2.

7. The method according to claim 1, wherein the clay contains from 2% to 17% of smectite.

8. The method according to claim 7, wherein the clay contains from 3% to 15% of smectite.

9. The method according to claim 1, wherein the clay further comprises at least 1% of calcite.

10. The method according to claim 1, wherein the clay comprises from 15% to 55% of an amorphous phase containing at least one of silica, alumina and calcium.

11. The method according to claim 9, wherein the clay contains from 20% to 50% of an amorphous phase containing at least one of silica, alumina and calcium.

12. The method according to claim 1, wherein the clay further comprises at least one of chlorite, quartz, dolomite, microcline and hematite.

* * * * *